United States Patent
Zhang et al.

(10) Patent No.: US 12,083,433 B2
(45) Date of Patent: Sep. 10, 2024

(54) VIRTUAL OBJECT CONTROL METHOD AND APPARATUS, TERMINAL, AND STORAGE MEDIUM

(71) Applicant: Tencent Technology (Shenzhen) Company Limited, Shenzhen (CN)

(72) Inventors: Si Ming Zhang, Shenzhen (CN); Ren Jie Li, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 311 days.

(21) Appl. No.: 17/498,281

(22) Filed: Oct. 11, 2021

(65) Prior Publication Data

US 2022/0054944 A1    Feb. 24, 2022

Related U.S. Application Data

(63) Continuation of application No. PCT/CN2021/112760, filed on Aug. 16, 2021.

(30) Foreign Application Priority Data

Aug. 21, 2020  (CN) .................. 202010848014.4

(51) Int. Cl.
*A63F 13/58*    (2014.01)
*A63F 13/2145*  (2014.01)
(Continued)

(52) U.S. Cl.
CPC .......... *A63F 13/58* (2014.09); *A63F 13/2145* (2014.09); *A63F 13/57* (2014.09); *A63F 13/69* (2014.09)

(58) Field of Classification Search
CPC ...... A63F 13/58; A63F 13/2145; A63F 13/57; A63F 13/69
See application file for complete search history.

(56) References Cited

U.S. PATENT DOCUMENTS 9,569,918 B2 *   2/2017  Inukai ................. G07F 17/3281
2004/0219976 A1 * 11/2004  Campbell ............... A63F 13/10
                                                      463/31
(Continued)

FOREIGN PATENT DOCUMENTS

CN    105727551 A    7/2016
CN    108228251 A    6/2018
(Continued)

OTHER PUBLICATIONS

International Search Report and Written Opinion received for Application No. PCT/CN2021/112760 mailed November 17, 2021 (English and Chinese languages), (11 pages).
Extended European Search Report received for Application No. EP 21783126.2 mailed Oct. 10, 2022 (12 pages).
(Continued)

*Primary Examiner* — Steve Rowland
(74) *Attorney, Agent, or Firm* — Crowell & Moring LLP

(57) ABSTRACT

A virtual object control includes displaying a display picture corresponding to a virtual environment and a particular attack control. In response to a touch operation for the particular attack control, a target behavior is determined from two different behaviors according to resources associated with the first virtual object. The first virtual object is controlled to perform the target behavior. This can improve congestion caused by excessive icons, reduce the misoperation probability of the user, and ensure operation accuracy.

18 Claims, 8 Drawing Sheets

(51) Int. Cl.
    *A63F 13/57*     (2014.01)
    *A63F 13/69*     (2014.01)

(56) References Cited

U.S. PATENT DOCUMENTS

| | | | |
|---|---|---|---|
| 2008/0070655 A1* | 3/2008 | Tanabe | A63F 13/24 463/7 |
| 2013/0288762 A1* | 10/2013 | Yoshie | A63F 13/25 463/8 |
| 2014/0295941 A1* | 10/2014 | Takahashi | A63F 13/493 463/24 |
| 2014/0323224 A1* | 10/2014 | Sasaki | A63F 13/69 463/42 |
| 2015/0011319 A1* | 1/2015 | Satsuma | A63F 13/69 463/42 |
| 2016/0114246 A1* | 4/2016 | Mashiko | A63F 13/497 463/9 |
| 2016/0236087 A1* | 8/2016 | McNeil | A63F 13/847 |
| 2017/0011210 A1* | 1/2017 | Cheong | A61B 5/681 |
| 2017/0216726 A1* | 8/2017 | Izumaru | A63F 13/67 |
| 2022/0054944 A1* | 2/2022 | Zhang | A63F 13/57 |

FOREIGN PATENT DOCUMENTS

| | | |
|---|---|---|
| CN | 109078236 A | 12/2018 |
| CN | 109078326 A | 12/2018 |
| CN | 110270098 A | 9/2019 |
| CN | 110639203 A | 1/2020 |
| CN | 110694261 A | 1/2020 |
| CN | 111905363 A | 11/2020 |

OTHER PUBLICATIONS

Japanese Office Action with English translation, dated Nov. 17, 2022, pp. 1-12, issued in Japanese Patent Application No. 2021-563118, Japan Patent Office, Tokyo, Japan.
Singapore Search Report and Written Opinion, dated Feb. 21, 2023, pp. 1-10, issued in Singapore Patent Application Number 11202111503Q, Intellectual Property Office of Singapore, Singapore.
Title: [Puzzle & Dragons] Thorough explanation of how the assist system works and how to set it up, dated Dec. 6, 2016, pp. 1-38, Smartphone game capture and latest information site. Available at URL: https://apri-game.com/pazudorasukirukeisyou-12546.
"[Starting 'Puzzle & Dragons'] Skill Boost and Skills pool," available at: https://app.famitsu.com/20150710_543926/, Published online: Jul. 10, 2015, accessed: Jun. 22, 2023.
"Stranglehold Introduction," available at: https://web.archive.org/web/20161027134756/http://www.success-corp.co.jp/software/ps3/stranglehold/intro.html, published online: 2016, accessed: Jun. 22, 2023.
Wii Virtual Console "Sengoku Denshou 2001", https://web.archive.org/web/20230524223436/https://game.snk-corp.co.jp/event/virtual-console/sengokudensyou2001/index_sengokudensyou2001_j.html, published online 2017, accessed Jun. 22, 2023.
Request for the Submission of an Opinion received from the Chinese Intellectual Property Ofice in Chinese Application No. 10-2021-7034292, dated Aug. 28, 2023 (in Chinese and including English translation).
"Samurai Showdown M Honestly, I really enjoyed the game . . . but why are you doing this??-Young Man-" 0:00-10:19, avaliable at tv.naver.com/v/8186189, published online Apr. 28, 2019.

* cited by examiner

VIRTUAL OBJECT CONTROL METHOD AND APPARATUS, TERMINAL, AND STORAGE MEDIUM

RELATED APPLICATION

This application is a continuation of PCT/CN2021/112760, filed on Aug. 16, 2021 and entitled "VIRTUAL OBJECT CONTROL METHOD AND APPARATUS, TERMINAL, AND STORAGE MEDIUM", which claims priority to Chinese Patent Application No. 202010848014.4, entitled "VIRTUAL OBJECT CONTROL METHOD AND APPARATUS, TERMINAL, AND STORAGE MEDIUM", filed on Aug. 21, 2020, each of which are incorporated by reference in their entirety.

FIELD OF THE TECHNOLOGY

This application relates to the field of computer and Internet technologies, and in particular, to a virtual object control method and apparatus, a terminal, and a storage medium.

BACKGROUND OF THE DISCLOSURE

The skill required for usage of virtual objects in game applications is constantly increasing. A user may control, through a skill control in a user interface, a first virtual object to use a skill to initiate an attack on a second virtual object. The second virtual object and the first virtual object may be in different camps. In a game application, a skill control is displayed in a user interface in the form of a skill icon, and a skill icon represents a unique skill, that is, different skill icons represent different skills. The user may control, through different skill icons, the first virtual object for those different skills.

However, in the foregoing related technology, a skill icon represents a unique skill, and when a virtual object has a plurality of skills, the user interface may have a limited area. As a result, skill icons have small sizes and close positions, and consequently misoperation of those icons is common.

SUMMARY

Embodiments of this application provide a virtual object control method and apparatus, a terminal, and a storage medium, to reduce a misoperation probability of a user and ensure operation accuracy. According to one embodiment, a virtual object control method is provided, performed by a terminal, the method including: displaying a display picture corresponding to a virtual environment and a particular attack control, the particular attack control being used for controlling a first virtual object in the virtual environment to perform at least two different behaviors; determining, in response to a touch operation for the particular attack control, a target behavior in the at least two different behaviors according to resources associated with or owned by the first virtual object, the resources being consumed items required for performing a behavior corresponding to the particular attack control; and controlling the first virtual object to perform the target behavior.

According to another embodiment, a virtual object control apparatus is provided, including: a control display module, configured to display a display picture corresponding to a virtual environment and a particular attack control, the particular attack control being used for controlling a first virtual object in the virtual environment to perform at least two different behaviors; a behavior determining module, configured to determine, in response to a touch operation for the particular attack control, a target behavior in the at least two different behaviors according to resources associated with or owned by the first virtual object, the resources being consumed items required for performing a behavior corresponding to the particular attack control; and a behavior execution module, configured to control the first virtual object to perform the target behavior.

According to another embodiment, a terminal is provided, including a processor and a memory, the memory storing at least one instruction, at least one program, a code set, or an instruction set, the at least one instruction, the at least one program, the code set, or the instruction set being loaded and executed by the processor to implement the foregoing virtual object control method.

According to another embodiment, a computer-readable storage medium is provided, storing at least one instruction, at least one program, a code set, or an instruction set, the at least one instruction, the at least one program, the code set, or the instruction set being loaded and executed by a processor to implement the foregoing virtual object control method.

According to another embodiment, a computer program product or a computer program is provided, the computer program product or the computer program including computer instructions, the computer instructions being stored in a computer-readable storage medium. A processor of a computer device reads the computer instructions from the computer-readable storage medium and executes the computer instructions to cause the computer device to perform the foregoing virtual object control method.

The technical solutions provided in the embodiments of this application may result in the following beneficial effects. A first virtual object can be controlled through a particular attack control to perform at least two different behaviors, so that one control controls different behaviors, to avoid interface congestion caused by excessive icons corresponding to operation controls, reduce the misoperation probability of the user, and ensure the operation accuracy; and when behaviors of the first virtual object are increased, no new icon corresponding to the operation controls needs to be added in a user interface, thereby effectively ensuring brevity of the user interface.

Additionally, when a touch operation for the particular attack control is detected, different behaviors to be performed by the first virtual object are selected from the at least two different behaviors based on resources associated with or owned by the first virtual object. That is, when the first virtual object owns different resources, actions of the particular attack control are different, so that the particular attack control is diversified, and the user may control the resources associated with or owned by the first virtual object to control the actions of the particular attack control, and then use the particular attack control to implement the different actions, making operations flexible.

BRIEF DESCRIPTION OF THE DRAWINGS

To describe the technical solutions in the embodiments of this application more clearly, the accompanying drawings used for describing the embodiments are briefly described below. The accompanying drawings in the following descriptions show merely some embodiments of this application, and a person of ordinary skill in the art may obtain other accompanying drawings according to these accompanying drawings without creative efforts.

DESCRIPTION OF EMBODIMENTS

To describe objectives, technical solutions, and advantages of this application, the following describes implementations and embodiments of this application with reference to the accompanying drawings.

Figure 1:
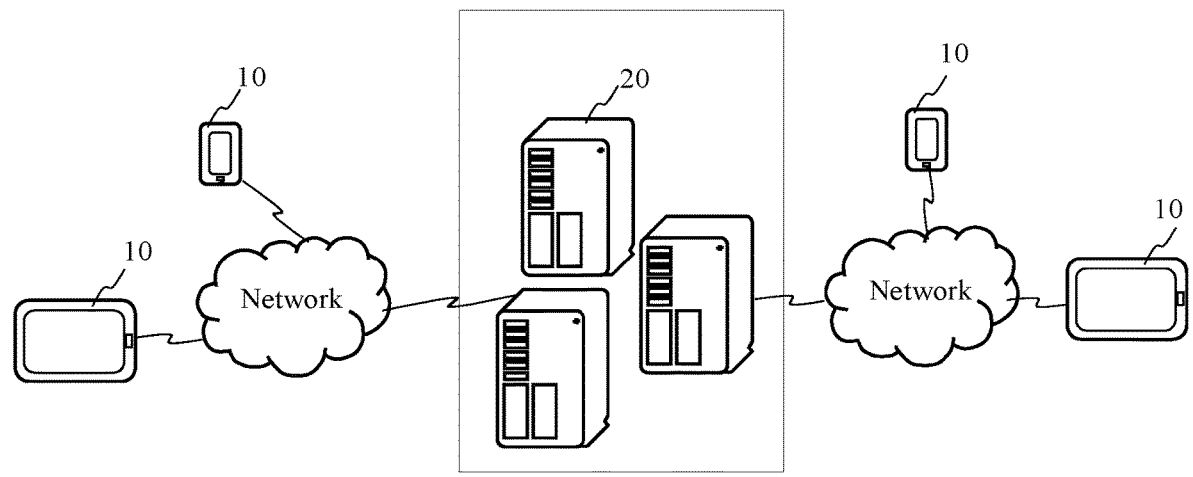
FIG. 1 is a schematic diagram of an application running environment according to an embodiment.

FIG. 1 is a schematic diagram of an application running environment according to an embodiment of this application. The application running environment may include a terminal 10 and a server 20.

The terminal 10 may be an electronic device such as a mobile phone, a tablet computer, a game console, an e-book reader, a multimedia player, a wearable device, or a personal computer (PC). A client of an application may be installed on the terminal 10. The application may be an application that needs to be downloaded and installed, or may be a click-to-use application. These are merely examples and other examples in additional embodiments are included and contemplated.

In one embodiment, the application may be any application that can provide a virtual environment for a virtual object substituted and operated by a user to perform activities in the virtual environment. Typically, the application is a game application, such as a multiplayer online battle arena (MOBA) game, a battle royale (BR) game, and a third-person shooting game (TPS), a first-person shooting game (FPS) and a multiplayer gun battle survival game. Certainly, in addition to the game applications, another type of application may also present a virtual object to a user and provide a corresponding function for the virtual object. For example, the foregoing application may be a virtual reality (VR) application, an augmented reality (AR) application, a three-dimensional map application, a military simulation application, a social application, an interactive entertainment application, or the like. These are merely examples and other examples in additional embodiments are included and contemplated. Besides, the form and corresponding function of the virtual object vary with different applications, and may be preset according to an actual requirement. These are merely examples and other examples in additional embodiments are included and contemplated. In some embodiments, a client of the foregoing application is run on the terminal 10. In some embodiments, the application is an application developed based on a three-dimensional virtual environment engine. For example, the virtual environment engine is a Unity engine. The virtual environment engine may construct a three-dimensional virtual environment, virtual objects, virtual props, and the like, to bring a more immersive gaming experience to the user.

The foregoing virtual environment is a scene displayed (or provided) when a client of an application (such as a game application) runs on a terminal. The virtual environment refers to a scene created for a virtual object to perform activities (such as game competition), such as a virtual house, a virtual island, a virtual map, or a virtual building. The virtual environment may be a simulated environment of a real world, or may be a semi-simulated and semi-fictional environment, or may be a completely fictional environment. The virtual environment may be a two-dimensional virtual environment, a 2.5-dimensional virtual environment, or a three-dimensional virtual environment. These are merely examples and other examples in additional embodiments are included and contemplated.

The foregoing virtual object may be a virtual character controlled by a user account in an application, or may be a virtual character controlled by a computer program in the application. For example, the application is a game application. The virtual object may be a game character controlled by the user account in the game application, or may be a game monster controlled by a computer program in the game application. The virtual object may be in a human form or animal, cartoon, or other forms. These are merely examples and other examples in additional embodiments are included and contemplated. The virtual object may be presented in a three-dimensional form or a two-dimensional form. These are merely examples and other examples in additional embodiments are included and contemplated. In some embodiments, when the virtual environment is a three-dimensional virtual environment, the virtual object is a three-dimensional model created based on a skeletal animation technology. Each virtual object has a respective shape and size in the three-dimensional virtual environment, and occupies some space in the three-dimensional virtual environment.

In one embodiment, the foregoing virtual objects include virtual objects in the same camp and virtual objects in different camps, that is, in the application, the virtual objects are divided into different camps. A MOBA game is used as an example. Ten users are divided into two teams of a red team and a blue team to play a game, that is, every five persons form a team. In this case, the red team and virtual objects in the red team are in the same camp and are teammates, the blue team and virtual objects in the blue team are in the same camp and are teammates, and the virtual objects in the red team and the blue team are in different camps and are in a hostile relationship.

The server 20 is configured to provide a backend service for the client of the application in the terminal 10. For example, the server 20 may be a backend server of the application. The server 20 may be one server, a server cluster including a plurality of servers, or a cloud computing service center. In some embodiments, the server 20 provides backend services for applications in a plurality of terminals 10. In some embodiments, the terminal 10 may communicate with the server 20 through a network.

Figure 2:
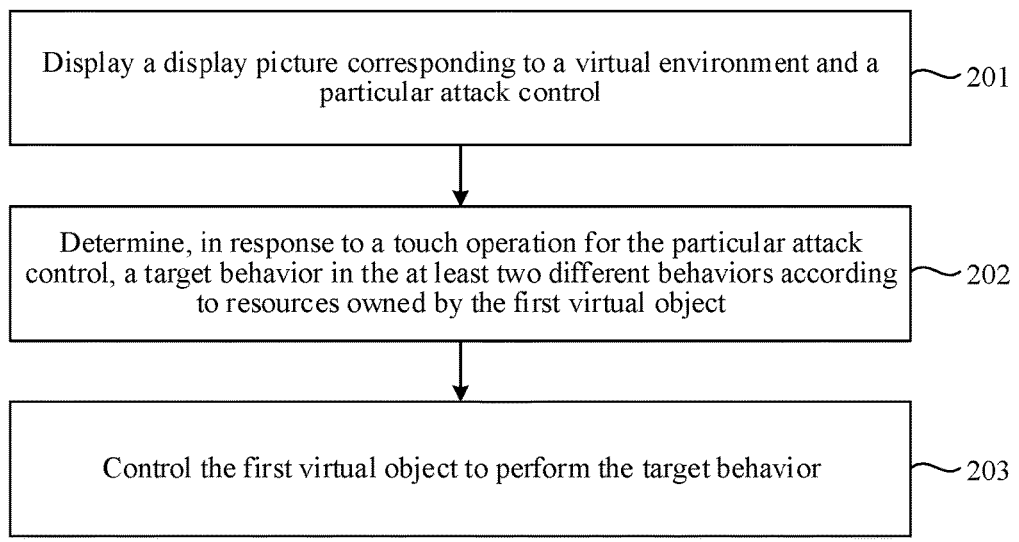
FIG. 2 is a flowchart of a virtual object control method according to an embodiment.

FIG. 2 is a flowchart of a virtual object control method according to an embodiment of this application. The method may be applied to a terminal. For example, an execution entity of each step may be the client of the application installed on the terminal 10 in the application running environment shown in FIG. 1. The method may include the following steps (201 to 203):

Step 201: Display a display picture corresponding to a virtual environment and a particular attack control.

The virtual environment is a scene used for a virtual object to perform an activity. The virtual object may be a virtual character controlled by a user account or may be a virtual character controlled by a computer program. In some embodiments, the virtual environment includes virtual islands, virtual maps, and virtual buildings. These are merely examples and other examples in additional embodiments are included and contemplated. In one embodiment, a user may control a first virtual object to interact with the virtual environment through a user account, such as entering or destroying a virtual building in the virtual environment, and attacking other virtual objects in the virtual environment. The foregoing user account may control one or more virtual objects. These are merely examples and other examples in additional embodiments are included and contemplated.

The display picture is a virtual environment picture presented to the user on a user interface. The virtual environment picture may be a picture obtained by a virtual camera from the virtual environment. In one embodiment, the virtual camera obtains a virtual environment picture from a third visual angle of the first virtual object. In some embodiments, the virtual camera is set obliquely above the first virtual object. The client uses the virtual camera to observe the virtual environment with the first virtual object as the center, obtains a virtual environment picture with the first virtual object as the center, and generates the display picture corresponding to the virtual environment. In another embodiment, the virtual camera obtains a virtual environment picture from a first visual angle of the first virtual object. In some embodiments, the virtual camera is set in front of the first virtual object or from the perspective of the first virtual object. The client uses the virtual camera to observe the virtual environment with the first visual angle of the first virtual object, obtains a virtual environment picture with the first visual angle of the first virtual object, and generates the display picture corresponding to the virtual environment. In an example embodiment, the placement position of the virtual camera is adjustable in real time. In some embodiments, the user may adjust the position of the virtual camera through a control operation for the user interface, and then obtain the display picture corresponding to the virtual environment at different positions. For example, the user drags the display picture corresponding to the virtual environment to adjust the position of the virtual camera. In another example, the user clicks/taps a position in a map presentation control, and uses the position as the adjusted position of the virtual camera to adjust the position of the virtual camera.

In one embodiment, the client may display the display picture corresponding to the foregoing virtual environment in the user interface. In some embodiments, after receiving a running instruction of the foregoing application or an enabling instruction of a game battle, the client may obtain a virtual environment picture through the foregoing virtual camera, and display the display picture corresponding to the virtual environment based on the virtual environment picture. In one embodiment, the foregoing user interface further includes a particular attack control. The particular attack control is a control used for controlling a virtual object to perform an attack behavior in the user interface, for example, the control may be a button, a joystick, or in another form. In some embodiments, the particular attack control is an ordinary attack control, the ordinary attack control is used for controlling a virtual object to perform an ordinary attack behavior, and the ordinary attack behavior is an attack behavior that each of a plurality of virtual objects has, for example, a plurality of virtual objects belonging to the same type has the same ordinary attack behavior. The ordinary attack may also be referred to as a common attack in some embodiments. For example, for a shooter-type virtual object, an ordinary attack behavior is a long-range physical attack behavior; for a warrior-type virtual object, an ordinary attack behavior is a short-range physical attack behavior; and for a wizard-type virtual object, an ordinary attack behavior is a long-range spell attack behavior. In some embodiments, the ordinary attack behavior is a behavior that does not need to consume any virtual resource and that has no cool-down duration; and there is an exclusive attack behavior corresponding to the ordinary attack behavior, the exclusive attack behavior is peculiar to a virtual object, that is, different virtual objects have different exclusive attack behaviors, each exclusive attack behavior has a corresponding exclusive attack control, and the user may control a virtual object through the exclusive attack control to perform a corresponding exclusive attack behavior. Usually, the foregoing ordinary attack behavior is referred to as an ordinary attack, and the foregoing exclusive attack behavior is referred to as a skill. Correspondingly, the ordinary attack control is referred to as an ordinary attack button, the exclusive attack control is referred to as a skill button, and a person skilled in the art may understand meanings thereof.

In one embodiment, while displaying the display picture corresponding to the foregoing virtual environment, the client may display the foregoing particular attack control. That is, after receiving the running instruction of the foregoing application or the enabling instruction of the game battle, the client displays both the display picture corresponding to the foregoing virtual environment and the foregoing particular attack control.

In another embodiment, to ensure interface brevity, the particular attack control is hidden in the foregoing user interface, and after receiving a display instruction of the foregoing particular attack control, the client displays the particular attack control. In some embodiments, the display instruction may be generated by trigger of the user in a display region of the particular attack control, and the display region may be any region in the user interface; or the display instruction is generated by trigger of the user in a touch region of the particular attack control, that is, when detecting a touch operation for the particular attack control, the client generates a display instruction of the particular attack control, and then displays the particular attack control in the user interface. The foregoing touch region may be a surrounding region of the particular attack control.

In one embodiment, the foregoing particular attack control is used for controlling the first virtual object in the virtual environment to perform at least two different behaviors. The behaviors are equivalent to operations, and the operations may be a skill cast operation, a virtual item use operation, a state switching operation, and the like. These are merely examples and other examples in additional embodiments are included and contemplated. In some embodiments, the user may control the foregoing first virtual object through the particular attack control to perform any one of the foregoing two different behaviors.

In one embodiment, the foregoing particular attack control is used for controlling the first virtual object in the virtual environment to cast at least two different skills, for example, an attack skill, a defense skill, and a healing skill.

In some embodiments, after detecting a touch operation for the foregoing particular attack control, the client controls the first virtual object to cast a skill, where the skill is any one of the foregoing at least two different skills. In an example embodiment, the foregoing user interface may include a plurality of operation controls for casting skills, and different operation controls are used for casting different skills, and different skills may alternatively be controlled and cast by the same operation control.

In another embodiment, the foregoing particular attack control is used for controlling the first virtual object in the virtual environment to use at least two different virtual items, for example, a virtual weapon, a virtual prop, and virtual equipment. In some embodiments, after detecting a touch operation for the foregoing particular attack control, the client controls the first virtual object to use a virtual item, where the virtual item is any one of the foregoing at least two different virtual items. In an example embodiment, the foregoing user interface may include a plurality of operation controls used for using virtual items, different operation controls are used for using different virtual items, and different virtual items may alternatively be controlled and used by the same operation control.

In still another embodiment, the foregoing particular attack control is used for controlling the first virtual object in the virtual environment to switch to at least two different states, for example, an attack state, a defense state, and a cure state. Different states correspond to different talent skills, that is, a virtual object may use the different talent skills in the different states. In some embodiments, after detecting a touch operation for the foregoing particular attack control, the client controls the first virtual object to perform state switching, where the state is any one of the foregoing at least two different states. In an example embodiment, the foregoing user interface may include a plurality of operation controls for switching states, and different operation controls are used for switching to different states, and different states may alternatively be controlled and switched by the same operation control.

Additionally, in an example embodiment, a designer may configure behaviors corresponding to the foregoing particular attack control according to an actual situation. These are merely examples and other examples in additional embodiments are included and contemplated. In one embodiment, the foregoing at least two different behaviors are the same type of behaviors, for example, the at least two different behaviors include two different skill cast behaviors. In another embodiment, the foregoing at least two different behaviors are different types of behaviors, for example, the at least two different behaviors include two different skill cast behaviors and one virtual item use behavior.

Step 202. Determine, in response to a touch operation for the particular attack control, a target behavior in the at least two different behaviors according to resources associated with or owned by the first virtual object.

The touch operation is an operation generated by trigger of the user. In a terminal equipped with a touch screen, the touch operation may be an operation of the user for the foregoing user interface. At a PC end, the touch operation may be an operation for the user for a key on a keyboard. In one embodiment, the touch operation may be an operation for the foregoing particular attack control. In some embodiments, the user may click/tap an icon corresponding to the particular attack control in the user interface to generate the operation for the particular attack control touch; or the user may press a key corresponding to the particular attack control (for example, a key R) to generate the operation for the particular attack control touch.

In some embodiments, after displaying the foregoing user interface, the client may detect the user interface, and after detecting a touch operation in the user interface, obtain a trigger position of the touch operation. When the trigger position is in a trigger region of the foregoing particular attack control, it is determined that the touch operation is a touch operation for the foregoing particular attack control.

In one embodiment, a position of each control in the user interface is fixed, and a fixed trigger region of each control is set in the user interface. The fixed trigger region may be any position in the user interface, for example, the fixed trigger region of the particular attack control is a surrounding region of the particular attack control. In some embodiments, the client may determine, according to the trigger position, whether the touch operation is located in the fixed trigger region of the particular attack control. If the touch operation is located in the fixed trigger region of the particular attack control, it is determined that the touch operation is the touch operation of the particular attack control.

In another embodiment, the position of each control in the user interface is adjustable, that is, the user may adjust the position of each control in the user interface according to an actual situation. In this case, an activity trigger region of each control is set in the user interface. The activity trigger region may be any region based on the position of the control. For example, the activity trigger region of the particular attack control is a region that is formed by a set of points spaced from a center position of the particular attack control by a distance less than a target value. In some embodiments, the client may determine a distance between the trigger position and the center position of the particular attack control according to the trigger position. If the distance is less than the target value, it is determined that the touch operation is the touch operation of the particular attack control.

In one embodiment, the client determines, when a touch operation for the particular attack control is detected, a target behavior in the at least two different behaviors according to resources associated with or owned by the first virtual object. The resources are consumed items required for performing a behavior corresponding to the particular attack control, and the target behavior is a behavior that the first virtual object needs to perform. In some embodiments, the at least two different behaviors include a first behavior, a second behavior, and a third behavior, and the client may determine the target behavior according to the quantity of resources. In some embodiments, the foregoing step 202 includes the following several steps:

1. Obtain a quantity of the resources associated with or owned by the first virtual object.
2. Determine the target behavior in the at least two different behaviors according to a value range to which the quantity belongs.

In some embodiments, a correspondence between value ranges of quantities and behaviors may be stored in advance in a configuration table. After determining a value range to which the quantity of resources associated with or owned by the first virtual object belongs, the client may query the configuration table to determine a corresponding target behavior.

In one embodiment, after detecting a touch operation for the particular attack control, the client obtains a quantity of resources associated with or owned by the first virtual object, and determines a target behavior in the at least two different behaviors according to a value range to which the quantity belongs. In some embodiments, when the quantity belongs to a first value range, the target behavior is determined as the first behavior; when the quantity belongs to a second value range, the target behavior is determined as the second behavior; and when the quantity belongs to a third value range, the target behavior is determined as the third behavior. The first behavior is used for fighting back against an attack behavior of a second virtual object; the second behavior is used for reducing a movement speed of the second virtual object and increasing health points of the first virtual object when health points of the second virtual object are reduced; and the third behavior is used for clearing the health points of the second virtual object when the health points of the second virtual object is less than a target value. The second virtual object is a virtual object in a camp different from that of the first virtual object; and the first value range, the second value range, and the third value range are pairwise independent and have no intersection.

Figure 3:
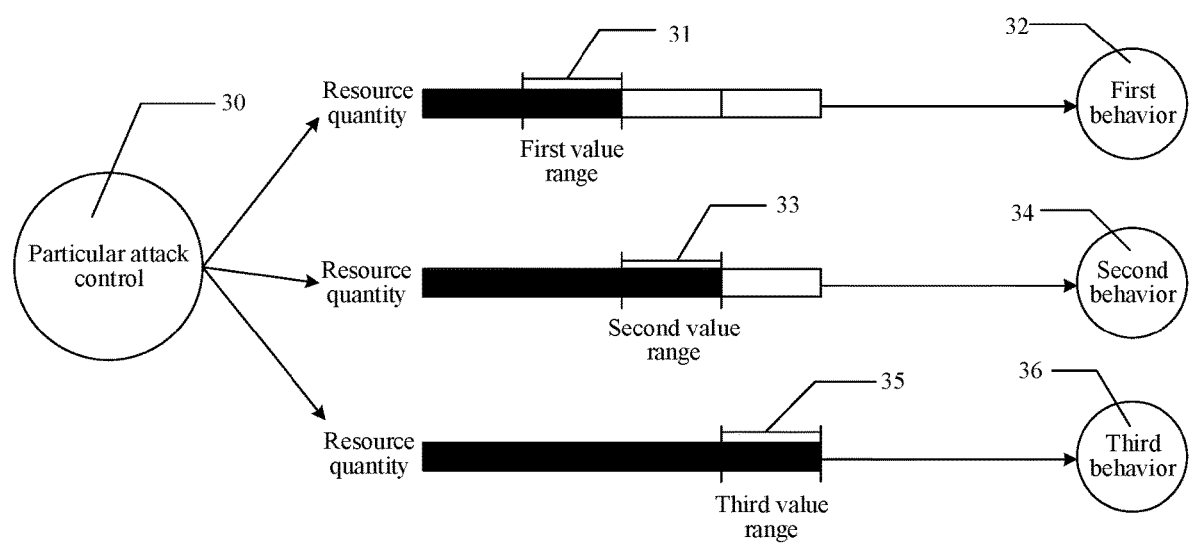
FIG. 3 is a schematic example diagram of a correspondence between quantities and target behaviors.

For example, with reference to FIG. 3, after the client detects a touch operation for a particular attack control 30, the target behavior is a first behavior 32 when the quantity of resources falls within a first value range 31; the target behavior is a second behavior 34 when the quantity of resources falls within a second value range 33; and the target behavior is a third behavior 36 when the quantity of resources falls within a third value range 35.

The foregoing descriptions of the first behavior, the second behavior, and the third behavior are only one example and are explanatory. In an example embodiment, a designer may design a function of each operation according to an actual situation. These are merely examples and other examples in additional embodiments are included and contemplated. In an example embodiment, the designer may also flexibly set and adjust a quantity of behaviors corresponding to the particular attack control. These are merely examples and other examples in additional embodiments are included and contemplated.

Further, the foregoing descriptions of the target behavior selecting manners are only one example. In an example embodiment, after displaying the display picture corresponding to the virtual environment, the client may detect resources associated with or owned by the first virtual object, determine different target behaviors according to different resources, and then directly control, after detecting the touch operation for the particular attack control, the first virtual object to perform the target behavior.

In some embodiments, the resources may be collected and obtained through a resource increase operation. In one embodiment, after displaying the display picture corresponding to the foregoing virtual environment, the client may detect the resource increase operation. The client determines a resource increase quantity of the first virtual object when a resource increase operation is detected; and updates the quantity of the resources associated with or owned by the first virtual object according to the resource increase quantity.

In some embodiments, the resource increase operation includes at least one of the following: the first virtual object killing a second virtual object, the first virtual object causing health points of the second virtual object to lose, the first virtual object performing a fifth behavior to cause health points of the second virtual object to lose, the first virtual object performing the fifth behavior, a touch operation for an operation control corresponding to the fifth behavior, and the first virtual object obtaining a resource increase prop, where the second virtual object is a virtual object in a camp different from that of the first virtual object.

That the first virtual object kills the second virtual object means that after the second virtual object receives an attack from the first virtual object, the health points of the second virtual object are zero. An attack value of the first virtual object for the second virtual object may be less than a maximum value of the health points of the second virtual object. Certainly, the attack value of the first virtual object for the second virtual object may alternatively be greater than or equal to the maximum value of the health points of the second virtual object. These are merely examples and other examples in additional embodiments are included and contemplated. In some embodiments, after detecting that the first virtual object kills the second virtual object, the client may determine the resource increase quantity according to the attack value of the first virtual object for the second virtual object, and update the quantity of resources associated with or owned by the first virtual object according to the resource increase quantity. For example, the attack value and the resource increase quantity are in a positive correlation.

That the first virtual object causes health points of the second virtual object to lose means that the first virtual object has successfully attacked the second virtual object. In some embodiments, after detecting that the first virtual object causes health points of the second virtual object to lose, the client may determine the resource increase quantity according to a health points loss value of the second virtual object, and update the quantity of resources associated with or owned by the first virtual object according to the resource increase quantity. For example, the health points loss value and the resource increase quantity are in a positive correlation.

That the first virtual object performs a fifth behavior to cause health points of the second virtual object to lose means that the first virtual object has successfully attacked the second virtual object by using the fifth behavior. The fifth behavior may be any behavior that the first virtual object can perform, for example, at least two different behaviors corresponding to the particular attack control. In some embodiments, after detecting that the first virtual object performs a fifth behavior to cause health points of the second virtual object to lose, the client may determine the resource increase quantity according to a health points loss value of the second virtual object, and update the quantity of resources associated with or owned by the first virtual object according to the resource increase quantity. For example, the health points loss value and the resource increase quantity are in a positive correlation.

That the first virtual object performs a fifth behavior means that the first virtual object performs a corresponding behavior. The fifth behavior may be any behavior that the first virtual object can perform, for example, at least two different behaviors corresponding to the particular attack control; or the fifth behavior may alternatively be a particular behavior of the first virtual object, for example, a skill cast behavior. These are merely examples and other examples in additional embodiments are included and contemplated. In some embodiments, after detecting that the first virtual object performs a fifth behavior, the client determines the resource increase quantity according to the fifth behavior, and updates the quantity of resources associated with or owned by the first virtual object according to the resource increase quantity. Resource increase quantities corresponding to different behaviors may be the same or different.

The touch operation for the operation control corresponding to the fifth behavior is a touch operation of a behavior. The fifth behavior may be any behavior that the first virtual object can perform, for example, at least two different behaviors corresponding to the particular attack control; or the fifth behavior may alternatively be a particular behavior of the first virtual object, for example, a skill cast behavior. These are merely examples and other examples in additional embodiments are included and contemplated. In some embodiments, after detecting a touch operation for an operation control corresponding to the fifth behavior, the client determines the resource increase quantity according to the fifth behavior, and updates the quantity of resources associated with or owned by the first virtual object according to the resource increase quantity. Resource increase quantities corresponding to different behaviors may be the same or different.

That the first virtual object obtains a resource increase prop means that the first virtual object collects the resource increase prop in the virtual environment. The resource increase prop may be placed at a particular position in the virtual environment when the display picture corresponding to the virtual environment is displayed, and may alternatively be a reward prop dropped when the first virtual object completes a particular behavior. These are merely examples and other examples in additional embodiments are included and contemplated. In some embodiments, after detecting that the first virtual object obtains a resource increase prop, the client determines the resource increase quantity according to the resource increase prop, and updates the quantity of resources associated with or owned by the first virtual object according to the resource increase quantity. Resource increase quantities corresponding to different resource increase props may be the same or different.

The resources are only items for the at least two behaviors. That is to say, the resources are consumed only when the first virtual object performs any behavior of the at least two behaviors other than the ordinary attack behavior; and when the first virtual object performs a behavior other than the at least two behaviors, the resources do not need to be consumed, and a corresponding behavior is not determined according to the resources either.

Step 203. Control the first virtual object to perform the target behavior.

The target behavior is a behavior that the first virtual object needs to perform. In some embodiments, the target behavior may be any one of the at least two different behaviors. The target behavior may be a skill cast behavior, a virtual item use behavior, a state switching behavior, or the like. These are merely examples and other examples in additional embodiments are included and contemplated.

In one embodiment, after determining the target behavior in the at least two different behaviors, the client controls the first virtual object to perform the target behavior. In some embodiments, when controlling the first virtual object to perform the target behavior, the client may determine the action target of the target behavior based on the action range of the target behavior, and then control the first virtual object to perform the target behavior for the action target. The action range is a behavior validation range of the target behavior, for example, an attack range of an attack skill, a throw range of a virtual item, or a jumping impact range of a virtual object. In some embodiments, different behaviors correspond to different action ranges.

In some embodiments, after obtaining the action range of the target behavior, the client may obtain attribute information of a target virtual object in the action range, and select an action target corresponding to the target behavior according to the attribute information. The target virtual object is an object to which the target behavior is directed. In some embodiments, when the target behavior is an attack behavior, the target virtual object is the second virtual object in a camp different from that of the first virtual object; and when the target behavior is a gaining behavior, the target virtual object is a virtual object in a camp the same as that of the first virtual object.

In one embodiment, the attribute information includes health points of the target virtual object. In some embodiments, the client may sort target virtual objects in ascending order of health points, and then select a top-ranked target virtual object as an action target corresponding to the target behavior according to a quantity of action targets of the target behavior.

In another embodiment, the attribute information includes a distance between the target virtual object and the first virtual object. In some embodiments, the client sorts target virtual objects in ascending order of distances, and then selects a top-ranked target virtual object as an action target corresponding to the target behavior according to a quantity of action targets of the target behavior.

In some embodiments, after determining the action target of the target behavior, the client controls the first virtual object to perform the target behavior for the action target.

The foregoing selection of the action target is only one example and is explanatory. In an example embodiment, the client may alternatively determine the action target corresponding to the target behavior according to other content in the attribute information, for example, a movement speed of the target virtual object, a defense value of the target virtual object, or an attack speed of the target virtual object.

In one embodiment, a first virtual object can be controlled through a particular attack control to perform at least two different behaviors, so that one control controls different behaviors, to avoid interface congestion caused by excessive icons corresponding to operation controls, reduce the misoperation probability of the user, and ensure the operation accuracy; and when behaviors of the first virtual object are increased, no new icon corresponding to the operation controls needs to be added in a user interface, thereby effectively ensuring brevity of the user interface.

Additionally, when a touch operation for the particular attack control is detected, different behaviors to be performed by the first virtual object are selected from the at least two different behaviors based on resources associated with or owned by the first virtual object. That is, when the first virtual object owns different resources, actions of the particular attack control are different, so that the particular attack control is diversified, and the user may control the resources associated with or owned by the first virtual object to control the actions of the particular attack control, and then use the particular attack control to implement the different actions, making operations flexible.

Figure 4:
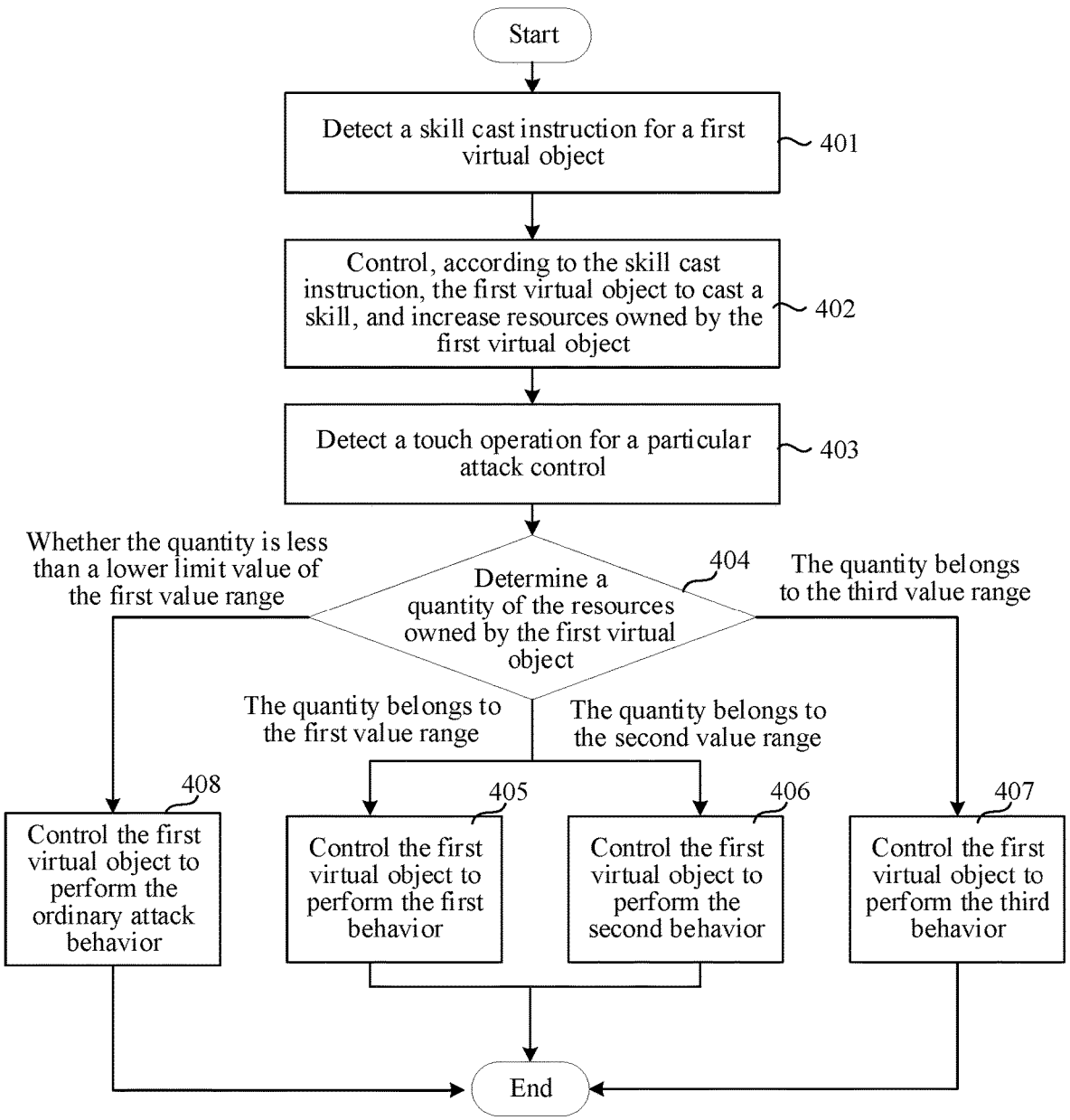
FIG. 4 is a schematic example diagram of a virtual object control method.

This example application is further described below with reference to FIG. 4.

Step 401. A client detects a skill cast instruction for a first virtual object.

In some embodiments, the user interface includes a plurality of skill operation controls, the skill operation controls are used for controlling the first virtual object to cast skills, and different skill operation controls correspond to different skills.

In one embodiment, after the user interface is displayed, the client detects the user interface. After a touch operation in the user interface is detected, a skill operation control to which the touch operation is directed is determined according to a position of the touch operation, and then a skill cast instruction for the first virtual object is generated according to the skill operation control.

Step 402. The client controls, according to the skill cast instruction, the first virtual object to cast a skill, and increases resources associated with or owned by the first virtual object.

In one embodiment, after detecting the skill cast instruction, the client controls, according to the skill cast instruction, the first virtual object to cast a corresponding skill, and increases resources associated with or owned by the first virtual object. The resources are consumed items required for performing a behavior corresponding to the particular attack control.

In some embodiments, when controlling the first virtual object to cast a skill, the client obtains a resource increase quantity corresponding to the skill; and further, with the resource increase quantity as a reference, increases resources associated with or owned by the first virtual object, and updates the quantity of resources currently associated with or owned by the first virtual object.

In some embodiments, resource increase quantities corresponding to different skills may be the same or different. These are merely examples and other examples in additional embodiments are included and contemplated.

In one embodiment, when different skills correspond to the same resource increase quantity, the client may predict the resource increase quantity, and then may obtain, when controlling the first virtual object to cast a skill, the resource increase quantity without considering the skill, thereby improving resource quantity update efficiency.

In another embodiment, when different skills correspond to different resource increase quantities, the client needs to first determine a skill when controlling the first virtual object to cast the skill, and then determine a resource increase quantity corresponding to the skill.

Step 403. The client detects a touch operation for a particular attack control.

In one embodiment, the user interface includes the particular attack control, and the particular attack control is an attack control that each virtual object has. after the user interface is displayed, the client detects the user interface. After a touch operation in the user interface is detected, whether the touch operation is an operation for the particular attack control is determined according to position of the touch operation. Then, when the touch operation is an operation for the particular attack control, the client determines that the touch operation for the particular attack control is detected.

Step 404. The client determines a quantity of the resources associated with or owned by the first virtual object.

In one embodiment, after detecting a touch operation for the particular attack control, the client obtains a quantity of resources associated with or owned by the first virtual object, and then determines, according to a value range to which the quantity belongs, a behavior that the first virtual object needs to perform.

Step 405. When the quantity belongs to a first value range, the client controls the first virtual object to perform a first behavior.

Step 406. When the quantity belongs to a second value range, the client controls the first virtual object to perform a second behavior.

Step 407. When the quantity belongs to a third value range, the client controls the first virtual object to perform a third behavior.

Step 408. When the quantity is less than a lower limit value of the first value range, the client controls the first virtual object to perform an ordinary attack behavior.

The foregoing is a simple description of the target behavior selecting manner. In one embodiment, the client may determine, based on the resources associated with or owned by the first virtual object, the target behavior with reference to an operation attribute of the touch operation for the particular attack control.

In an example embodiment, the foregoing step 202 includes the following several steps:
1. Obtain a quantity of the resources associated with or owned by the first virtual object.
2. Determine an operation attribute of the touch operation.
3. Determine the target behavior in the at least two different behaviors according to the quantity and the operation attribute.

The operation attribute is used for representing an attribute of the touch operation. Different touch operations have different operation attributes. In some embodiments, the operation attribute includes but is not limited to at least one of the following: a touch duration, a touch pressure, a quantity of touch times, and a touch direction.

The touch duration is a duration of the touch operation. In some embodiments, the client may begin timing from a moment at which the touch operation is detected, until the touch operation disappears, to obtain the touch duration of the touch operation. The touch pressure is a value of a pressure generated by the touch operation of the user and detected through a pressure sensor. The quantity of touch times is a quantity of times of continuously touching a control by the user in a time threshold. For example, a quantity of touch times corresponding to a click operation is 1, a quantity of touch times corresponding to a double-click operation is 2, and a quantity of touch times corresponding to a triple-click operation is 3. The touch direction is a direction of a slide track when the touch operation is a slide operation.

In one embodiment, after detecting a touch operation for the ordinary attack control, the client obtains a quantity of resources associated with or owned by the first virtual object and the operation attribute of the touch operation, and then determines a target behavior in the at least two different behaviors according to the quantity and the operation attribute.

In one embodiment, the client determines, according to a range to which the quantity of resources associated with or owned by the first virtual object belongs, the target behavior with reference to the operation attribute of the touch operation. In some embodiments, the target behavior is determined as the first behavior when the quantity belongs to a first value range and the operation attribute is a first operation attribute. The target behavior is determined as the second behavior when the quantity belongs to a second value range and the operation attribute is the first operation attribute; and the target behavior is determined as the first behavior when the quantity belongs to the second value range and the operation attribute is a second operation attribute. The target behavior is determined as the third behavior when the quantity belongs to a third value range and the operation attribute is the first operation attribute; the target behavior is determined as the first behavior when the quantity belongs to the third value range and the operation attribute is the second operation attribute; and the target behavior is determined as the second behavior when the quantity belongs to the third value range and the operation attribute is a third operation attribute.

Settings about the first value range, the second value range, and the third value range are merely examples and are not limited in the embodiments. In some embodiments, the first value range, the second value range, and the third value range may be mutually consecutive value ranges. For example, the first value range is from 10 to 20, the second value range is from 20 to 30, and the third value range is from 30 to 40. Alternatively, the first value range, the second value range, and the third value range may be mutually non-consecutive value ranges. For example, the first value range is from 10 to 20, the second value range is from 30 to 40, and the third value range is from 50 to 60.

Further, settings about the first operation attribute, the second operation attribute, and the third operation attribute are merely examples and are not limited in the embodiments. In some embodiments, different touch operations correspond to different operation attributes. For example, when the touch operation is a click/tap operation, the operation attribute may be a quantity of touch times, for example, the first operation attribute is 1 time of touch, the second operation attribute is 2 times of touch, and the third operation attribute is 3 times of touch; or the operation attribute may be a touch duration, for example, the first operation attribute is 1s of touch, the second operation is 2 s of touch, and the third operation attribute is 3 s of touch. In another example, when the touch operation is a slide operation, the operation attribute is a slide direction, for example, the first operation attribute is upward slide, the second operation attribute is downward slide, and the third operation attribute is left slide.

Figure 5:
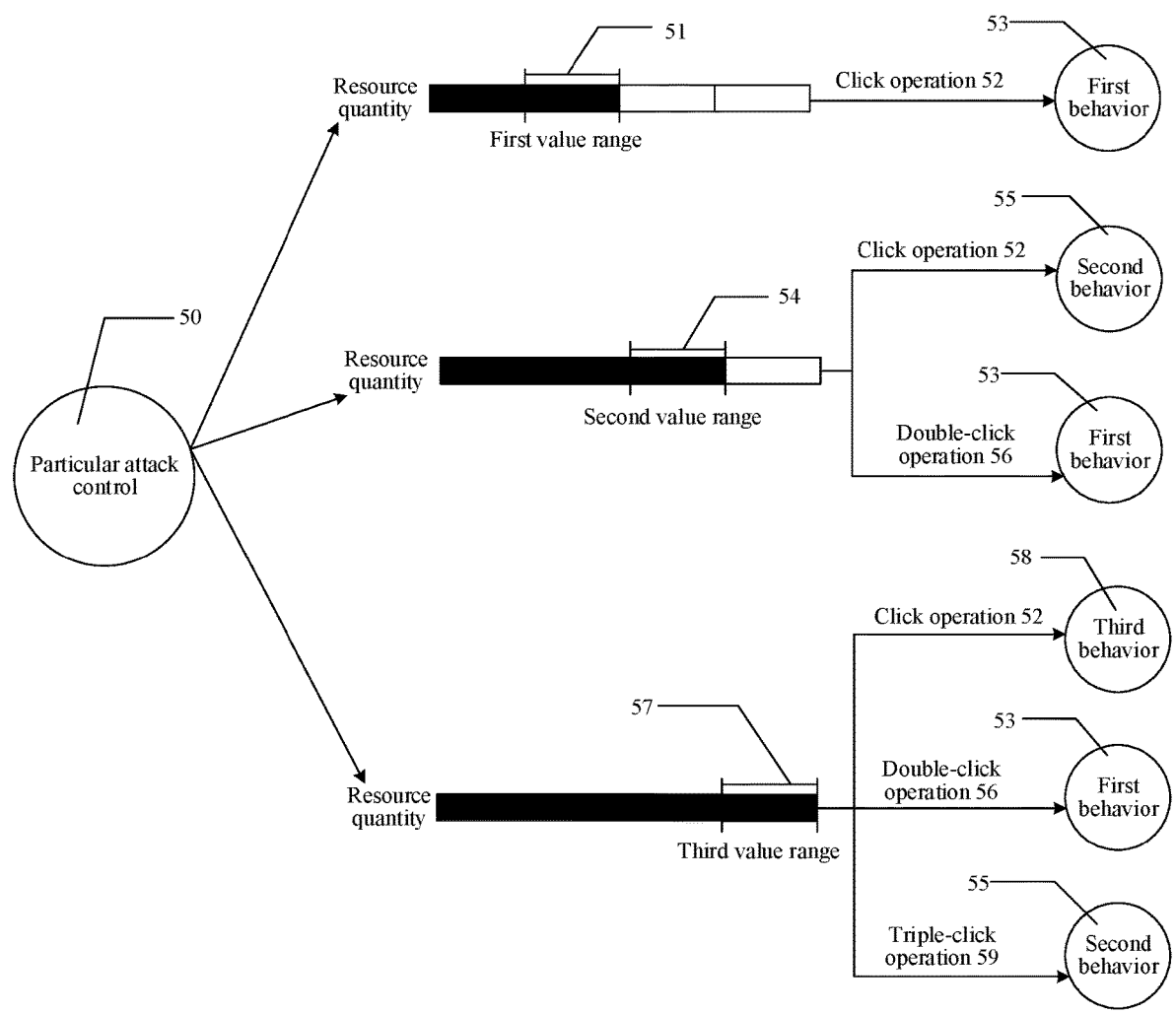
FIG. 5 and FIG. 6 are schematic example diagrams of two other correspondences between quantities and target behaviors.

Fr example, with reference to FIG. 5, using an example in which a touch operation is a click/tap operation and an operation attribute is a quantity of touch times, after the client detects a touch operation for a particular attack control 50, when the quantity belongs to a first value range 51, if the touch operation is a click operation 52, a target behavior is a first behavior 53. When the quantity belongs to a second value range 54, if the touch operation is the click operation 52, the target behavior is a second behavior 55; and if the touch operation is a double-click operation 56, the target behavior is the first behavior 53. When the quantity belongs to a third value range 57, if the touch operation is the click operation 52, the target behavior is a third behavior 58; if the touch operation is the double-click operation 56, the target behavior is the first behavior 53; and if the touch operation is a triple-click operation 59, the target behavior is the second behavior 55.

In another embodiment, the client determines, according to the operation attribute of the touch operation, the target behavior with reference to a relationship between a quantity of resources associated with or owned by the first virtual object and a threshold. In some embodiments, the target behavior is determined as the first behavior when the operation attribute is a first operation attribute and the quantity is greater than a first threshold. The target behavior is determined as the second behavior when the operation attribute is a second operation attribute and the quantity is greater than a second threshold; and the target behavior is determined as the first behavior when the operation attribute is the second operation attribute and the quantity is less than the second threshold and greater than the first threshold. The target behavior is determined as the third behavior when the operation attribute is a third operation attribute and the quantity is greater than a third threshold; the target behavior is determined as the second behavior when the operation attribute is the third operation attribute and the quantity is less than the third threshold and greater than the second threshold; and the target behavior is determined as the first behavior when the operation attribute is the third operation attribute and the quantity is less than the second threshold and greater than the first threshold.

Settings about the first threshold, the second threshold, and the third threshold are merely examples and are not limited in the embodiments. In some embodiments, the first threshold, the second threshold, and the third threshold may be any value. For example, the first threshold is 10, the second threshold is 20, and the third threshold is 30.

Figure 6:
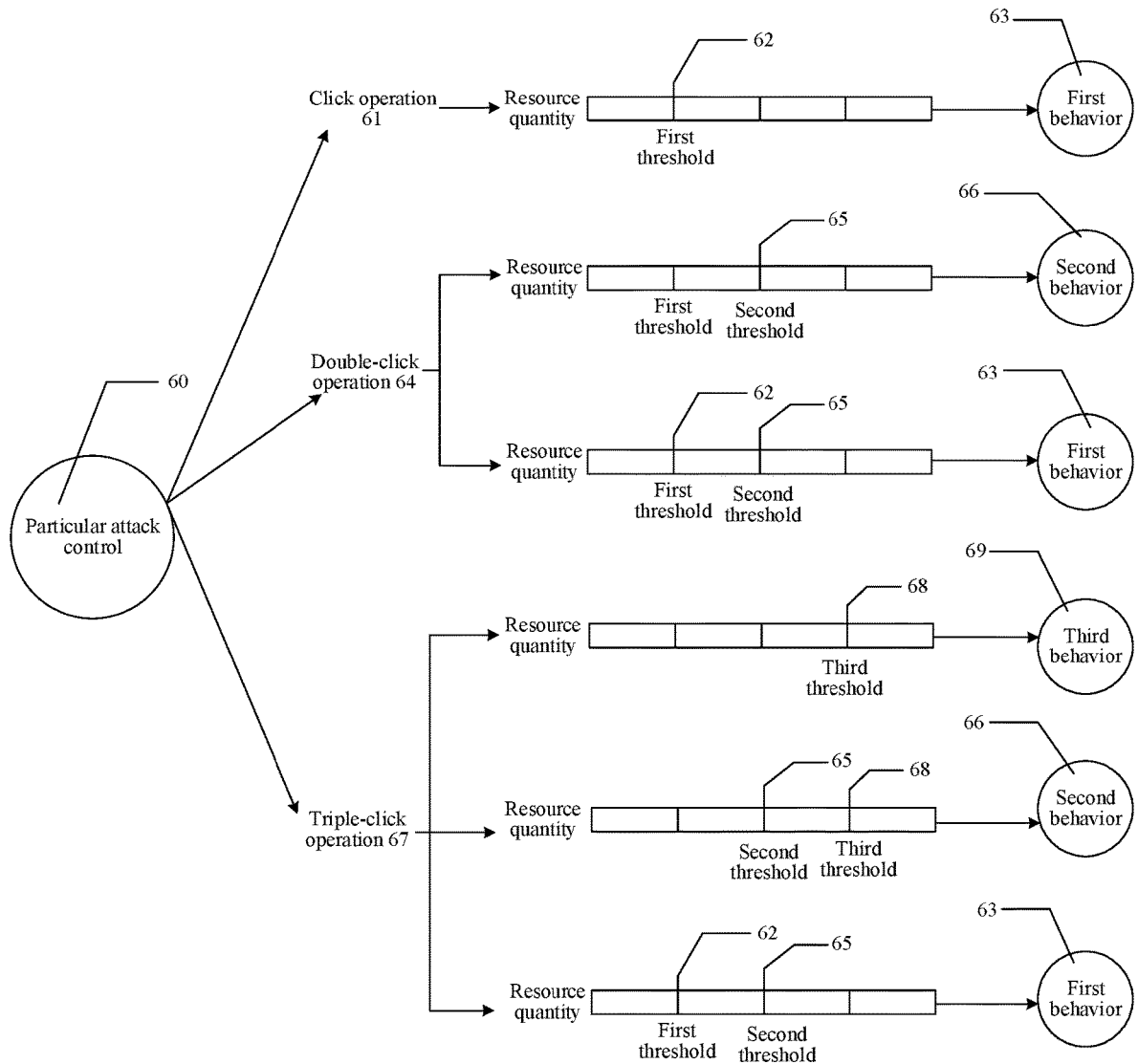

For example, with reference to FIG. 6, using an example in which a touch operation is a click/tap operation and an operation attribute is a quantity of touch times, after the client detects a touch operation for a particular attack control 60, when the touch operation is a click operation 61, if the quantity is greater than a first threshold 62, a target behavior is a first behavior 63. When the touch operation is a double-click operation 64, if the quantity is greater than a second threshold 65, the target behavior is a second behavior 66; and if the quantity is less than the second threshold 65 and greater than the first threshold 62, the target behavior is the first behavior 63. When the touch operation is a triple-click operation 67, if the quantity is greater than a third threshold 68, the target behavior is a third behavior 69; if the quantity is less than the third threshold 68 and greater than the second threshold 65, the target behavior is the second behavior 66; and if the quantity is less than the second threshold 65 and greater than the first threshold 62, the target behavior is the first behavior 63.

In one embodiment, the particular attack control may be further used for controlling the first virtual object to perform an ordinary attack behavior. The ordinary attack behavior is a physical attack behavior of the first virtual object. In some embodiments, the ordinary attack behavior may be a behavior that does not need to consume any virtual resource and that has no cool-down duration. The cool-down duration is a minimum value of a cast time interval between the same behaviors, and the virtual resource may be the foregoing resource, and may alternatively be energy that another behavior needs to consume. These are merely examples and other examples in additional embodiments are included and contemplated. In an example embodiment, the ordinary attack behavior may be a behavior that each of a plurality of virtual objects has. In some embodiments, the same type of virtual objects corresponds to similar ordinary attack behaviors, for example, similar attack distances. However, other behaviors (for example, referred to as skills) of a virtual object different from the ordinary attack behavior are unique, and virtual objects have different other behaviors (that is, exclusive attack behaviors described above). That is, any behavior of the other behaviors can only be exclusive to a particular virtual object, and other virtual objects cannot have the any behavior. In one embodiment, each of the first behavior, the second behavior, and the third behavior of the first virtual object is a behavior exclusive to the first virtual object, and other virtual objects cannot have the first behavior, the second behavior, or the third behavior; and the ordinary attack behavior of the first virtual object is not a behavior exclusive to the first virtual object, and other virtual objects in a type the same as that of the first virtual object may also have the same ordinary attack behavior. In some embodiments, the at least two different behaviors further include a fourth behavior, and the fourth behavior is an ordinary attack behavior.

Figure 7:
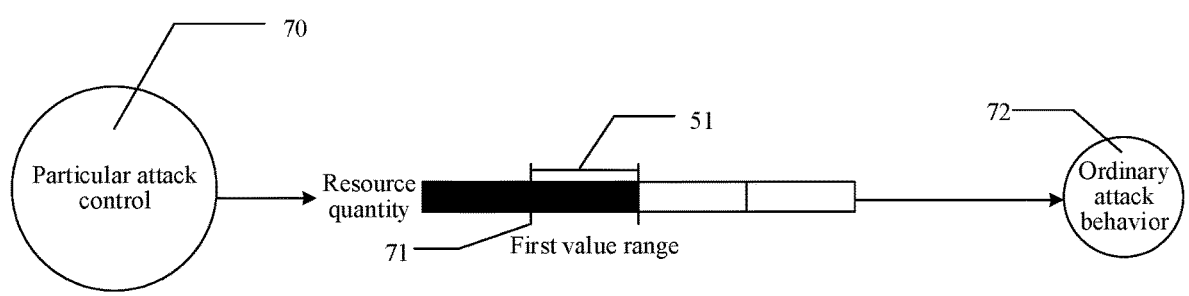
FIG. 7 is a schematic example diagram of another correspondence between quantities and target behaviors.

In one embodiment, after the client detects the touch operation for the particular attack control, when the quantity of resources associated with or owned by the first virtual object is less than the first threshold, the target behavior is determined as the fourth behavior. The first threshold may be less than or equal to the lower limit value of the first value range. As shown in FIG. 7, after the client detects a touch operation for a particular attack control 70, when the quantity of resources associated with or owned by the first virtual object is less than a lower limit value 71 of the first value range 51, the target behavior is an ordinary attack behavior 72.

In another embodiment, after the client detects the touch operation for the particular attack control, when the quantity of resources associated with or owned by the first virtual object is greater than the first threshold and the touch operation is a fourth operation attribute, the target behavior is determined as the ordinary attack behavior. The fourth operation attribute is any operation attribute different from each of the first operation attribute, the second operation attribute, and the third operation attribute.

Figure 8:
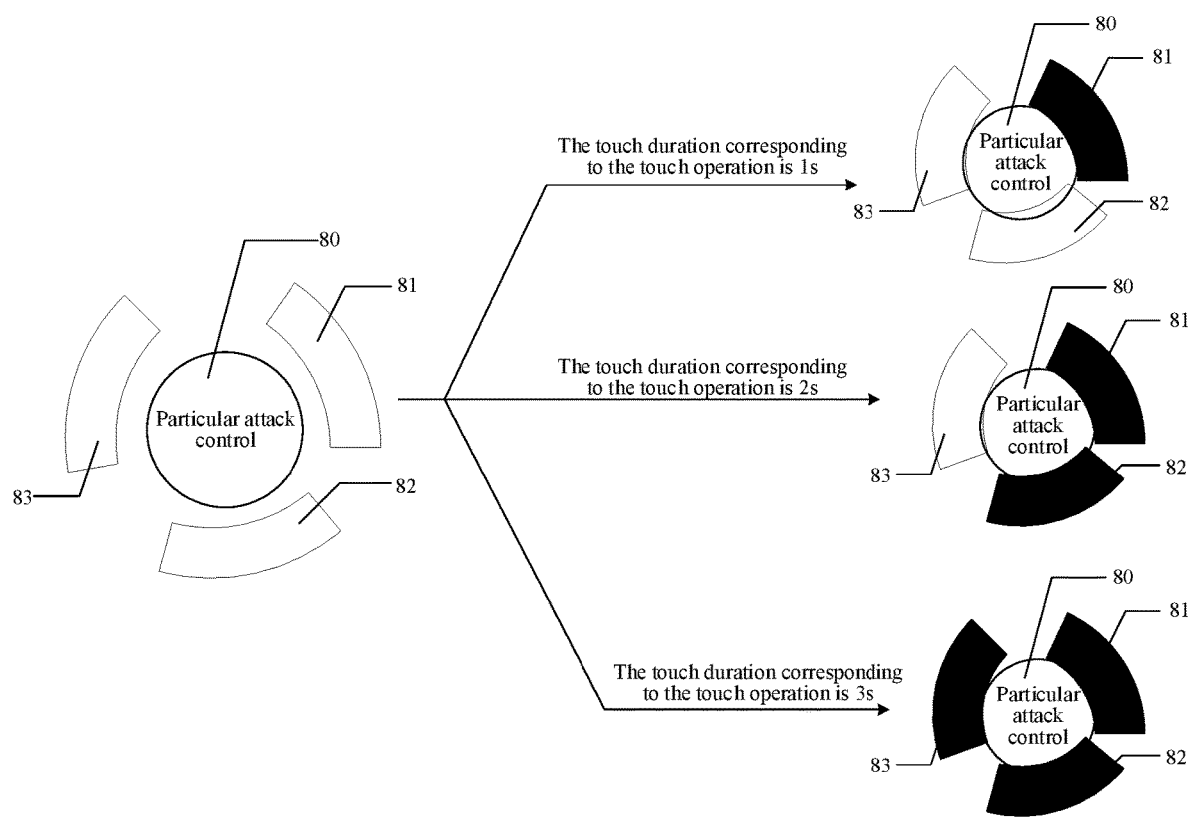
FIG. 8 is a schematic example diagram of an operation attribute reminding manner or prompt.

In some embodiments, to enable the user to accurately grasp the operation attribute of the touch operation, to ensure that the target behavior performed by the first virtual object is a behavior required by the user, a reminding item may be included around the particular attack control. The reminding item may also be referred to as a prompt. For different operation attributes, the prompts are in different display styles. For example, with reference to FIG. 8, a first prompt 81, a second prompt 82, and a third prompt 83 are disposed around a particular attack control 80. When the touch duration corresponding to the touch operation is 1s, the first prompt 81 is highlighted; when the touch duration corresponding to the touch operation is 2 s, the first prompt 81 and the second prompt 82 are highlighted; and when the touch duration corresponding to the touch operation is 3 s, the first prompt 81, the second prompt 82, and the third prompt 83 are highlighted.

The target behavior is determined above in a manner of combining the quantity and the operation attribute. In another embodiment, to ensure operation flexibility and convenience, the client may alternatively determine the target behavior according to only the quantity of resources associated with or owned by the first virtual object. In some embodiments, the user interface may include a function switch control, the function switch control being used for enabling or disabling a function of collecting the resources. The user may control enabling or disabling of the function of collecting the resources, to control the quantity of resources associated with or owned by the first virtual object, and then control the target behavior corresponding to the particular attack control. In some embodiments, example steps are as follows:

1. Display a function switch control.
2. Disable, when the function of collecting the resources is in an enabled state, the function of collecting the resources for the first virtual object in response to a touch operation for the function switch control.
3. Enable, when the function of collecting the resources is in a disabled state, the function of collecting the resources for the first virtual object in response to a touch operation for the function switch control.

The function switch control is a control used for enabling or disabling the function of collecting the resources. In some embodiments, the function switch control may be set on any position in the user interface. In one embodiment, while displaying the display picture corresponding to the foregoing virtual environment, the client may display the function switch control. In another embodiment, to ensure interface brevity, the function switch control is hidden in the foregoing user interface, and after receiving a display instruction of the foregoing function switch control, the client displays the function switch control. In some embodiments, the display instruction may be generated by trigger of the user in a display region of the function switch control, and the display region may be any region in the user interface. In another embodiment, the display instruction is generated by trigger of the user in a touch region of the function switch control, that is, when detecting a touch operation for the function switch control, the client generates a display instruction of the function switch control, and then displays the function switch control in the user interface. The foregoing touch region may be a surrounding region of the function switch control.

In one embodiment, when the function of collecting the resources is in an enabled state, the function of collecting the resources for the first virtual object is disabled if the client detects a touch operation for the function switch control. In this case, the first virtual object cannot collect the resources, and the target behavior corresponding to the particular attack control is in a fixed state. When the function of collecting the resources is in a disabled state, the function of collecting the resources for the first virtual object is enabled if the client detects a touch operation for the function switch control. In this case, the first virtual object can collect the resources, and the target behavior corresponding to the particular attack control is in a changing state.

Figure 9:
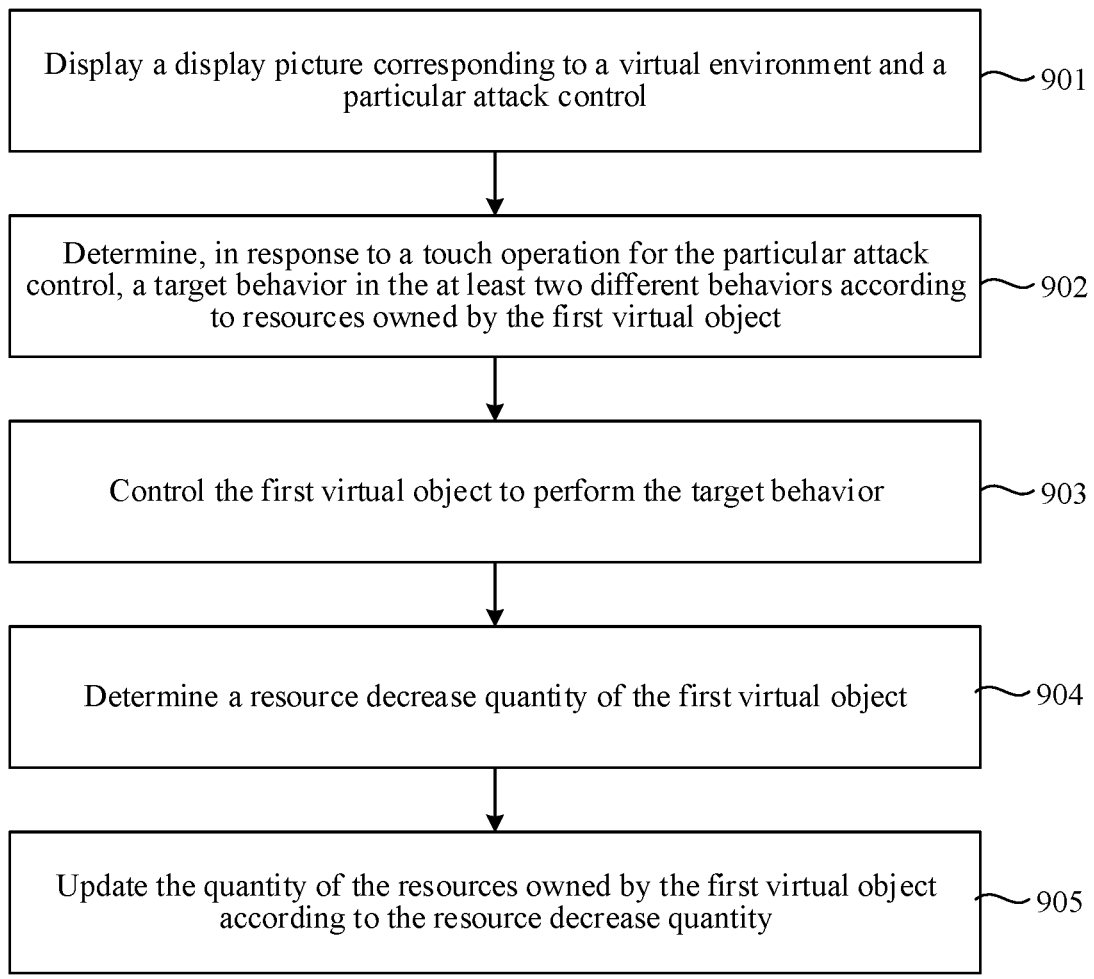
FIG. 9 is a flowchart of a virtual object control method according to another embodiment.

FIG. 9 is a flowchart of a virtual object control method according to another embodiment of this application. The method may be applied to a terminal. For example, an execution entity of each step may be the terminal 10 (referred to as the "client" below) in the running environment of the application shown in FIG. 1. The method may include the following steps (901 to 905):

Step 901: Display a display picture corresponding to a virtual environment and a particular attack control.

Step 902. Determine, in response to a touch operation for the particular attack control, a target behavior in the at least two different behaviors according to resources associated with or owned by the first virtual object.

Step 903. Control the first virtual object to perform the target behavior.

Step 901 to step 903 are the same as step 201 to step 203 in the embodiment of FIG. 2. For details, reference is made to the embodiment of FIG. 2. Details are already described herein.

Step 904. Determine a resource decrease quantity of the first virtual object.

The resource decrease quantity is used for indicating resources consumed by the first virtual object to perform the target behavior. In some embodiments, resource decrease quantities corresponding to different target behaviors may be the same or different. In one embodiment, after controlling the first virtual object to perform the target behavior, the client obtains the resource decrease quantity of the first virtual object. In one embodiment, the client obtains the resource decrease quantity according to the target behavior, that is, the resource decrease quantity corresponding to the same target behavior is unchanged. In another embodiment, the client obtains the resource decrease quantity according to an action effect of the target behavior, that is, the resource decrease quantity corresponding to the same target behavior is a changing value. The action effect is used for indicating an effect on the virtual environment or virtual object after the target behavior is performed, and the action effect includes at least one of the following: a quantity of action targets of the target behavior, combat power of an action target of the target behavior, virtual resources associated with or owned by an action target of the target behavior, a health points loss value caused by the target behavior to an action target, and the like.

Step 905. Update a quantity of the resources associated with or owned by the first virtual object according to the resource decrease quantity.

In one embodiment, after obtaining the resource decrease quantity, the client updates the quantity of the resources associated with or owned by the first virtual object according to the resource decrease quantity.

In one embodiment, a first virtual object can be controlled through a particular attack control to perform at least two different behaviors, so that one control controls different behaviors, improving interface display brevity. When the first virtual object owns different resources, actions of the particular attack control are different, so that the particular attack control is diversified, and the user may control the resources associated with or owned by the first virtual object to control the actions of the particular attack control, making operations flexible. Moreover, after a target behavior is performed, the resources associated with or owned by the first virtual object are consumed, to ensure game battle fairness.

The following is an apparatus embodiment of this application, which can be used to execute the method embodiments of this application. For details not disclosed in the apparatus embodiments of this application, reference is made to the method embodiments of this application.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

Figure 10:
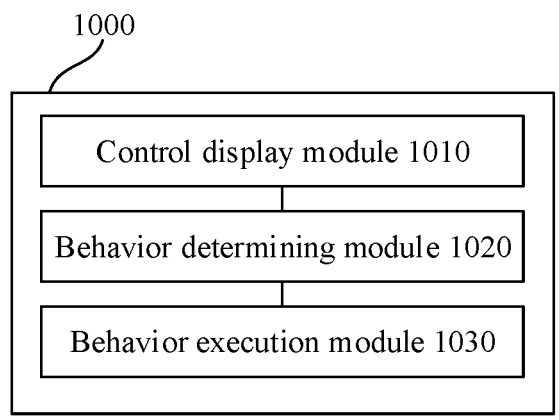
FIG. 10 is a block diagram of a virtual object control apparatus according to an embodiment.

FIG. 10 is a block diagram of a virtual object control apparatus according to an embodiment of this application. The apparatus has a function of implementing the foregoing virtual object control methods, and the function may be implemented by hardware or by hardware executing corresponding software. The apparatus may be a terminal or may be disposed in a terminal. The apparatus 1000 may include: a control display module 1010, a behavior determining module 1020, and a behavior execution module 1030.

The control display module 1010 is configured to display a display picture corresponding to a virtual environment and a particular attack control, the particular attack control being used for controlling a first virtual object in the virtual environment to perform at least two different behaviors.

The behavior determining module 1020 is configured to determine, in response to a touch operation for the particular attack control, a target behavior in the at least two different behaviors according to resources associated with or owned by the first virtual object, the resources being consumed items required for performing a behavior corresponding to the particular attack control.

The behavior execution module 1030 is configured to control the first virtual object to perform the target behavior.

Figure 11:
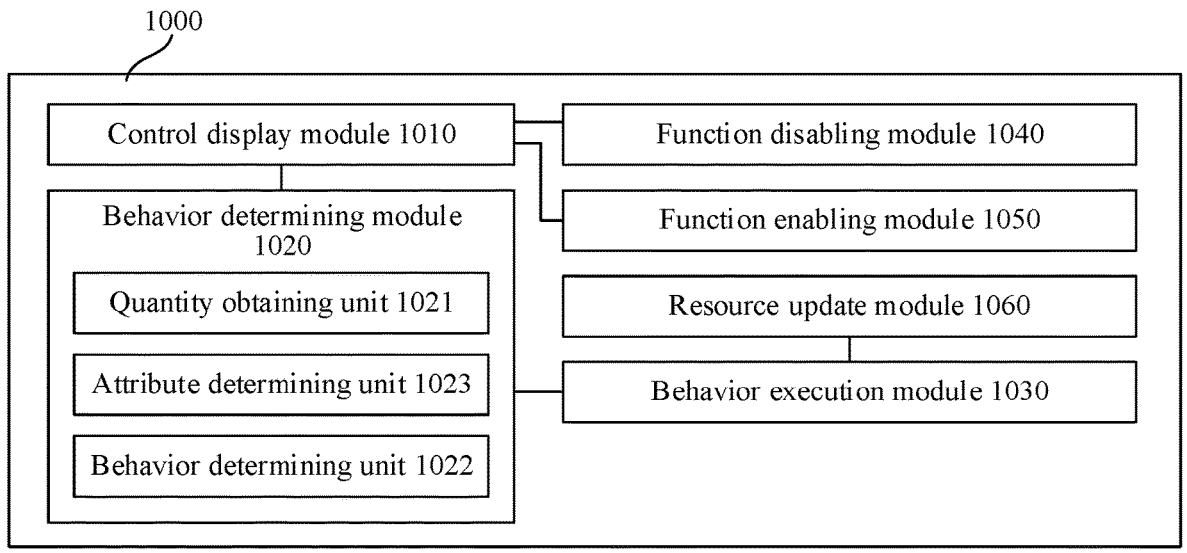
FIG. 11 is a block diagram of a virtual object control apparatus according to another embodiment.

In an example embodiment, as shown in FIG. 11, the behavior determining module 1020 further includes: a quantity obtaining unit 1021 and a behavior determining unit 1022.

The quantity obtaining unit 1021 is configured to obtain a quantity of the resources associated with or owned by the first virtual object.

The behavior determining unit 1022 is configured to determine the target behavior in the at least two different behaviors according to a value range to which the quantity belongs.

In an example embodiment, the at least two different behaviors include a first behavior, a second behavior, and a third behavior; and the behavior determining unit 1022 is configured to determine the target behavior as the first behavior when the quantity belongs to a first value range; determine the target behavior as the second behavior when the quantity belongs to a second value range; and determine the target behavior as the third behavior when the quantity belongs to a third value range, where the first value range, the second value range, and the third value range are pairwise independent and have no intersection.

In an example embodiment, as shown in FIG. 11, the behavior determining module 1020 further includes: an attribute determining unit 1023. The quantity obtaining unit 1021 is configured to obtain a quantity of the resources associated with or owned by the first virtual object. The attribute determining unit 1023 is configured to determine an operation attribute of the touch operation. The behavior determining unit 1022 is further configured to determine the target behavior in the at least two different behaviors according to the quantity and the operation attribute.

In an example embodiment, the at least two different behaviors include a first behavior, a second behavior, and a third behavior; and the behavior determining unit 1023 is configured to determine the target behavior as the first behavior when the quantity belongs to a first value range and the operation attribute is a first operation attribute; determining the target behavior as the second behavior when the quantity belongs to a second value range and the operation attribute is the first operation attribute; and determine the target behavior as the first behavior when the quantity belongs to the second value range and the operation attribute is the second operation attribute; determining the target behavior as the third behavior when the quantity belongs to a third value range and the operation attribute is the first operation attribute; determining the target behavior as the first behavior when the quantity belongs to the third value range and the operation attribute is the second operation attribute; and determining the target behavior as the second behavior when the quantity belongs to the third value range and the operation attribute is a third operation attribute.

In an example embodiment, the at least two different behaviors include a first behavior, a second behavior, and a third behavior; and the behavior determining unit 1023 is configured to determine the target behavior as the first behavior when the operation attribute is a first operation attribute and the quantity is greater than a first threshold; determine the target behavior as the second behavior when the operation attribute is a second operation attribute and the quantity is greater than a second threshold; and determine the target behavior as the first behavior when the operation attribute is the second operation attribute and the quantity is less than the second threshold and greater than the first threshold; and determine the target behavior as the third behavior when the operation attribute is a third operation attribute and the quantity is greater than a third threshold;

determine the target behavior as the second behavior when the operation attribute is the third operation attribute and the quantity is less than the third threshold and greater than the second threshold; and determine the target behavior as the first behavior when the operation attribute is the third operation attribute and the quantity is less than the second threshold and greater than the first threshold.

In an example embodiment, the first behavior is used for fighting back against an attack behavior of a second virtual object; the second behavior is used for reducing a movement speed of the second virtual object and increasing health points of the first virtual object when health points of the second virtual object are reduced; and the third behavior is used for clearing the health points of the second virtual object when the health points of the second virtual object is less than a target value, where the second virtual object is a virtual object in a camp different from that of the first virtual object.

In an example embodiment, the at least two different behaviors further include a fourth behavior, and the fourth behavior is an ordinary attack behavior; and the operation determining module 1020 is further configured to determine the target behavior as the fourth behavior when the quantity is less than the first threshold; or determine the target behavior as the fourth behavior when the quantity is greater than the first threshold and the operation attribute of the touch operation is a fourth operation attribute.

In an example embodiment, as shown in FIG. 11, the apparatus 1000 further includes: a function disabling module 1040 and a function enabling module 1050. The control display module 1010 is further configured to display a function switch control, the function switch control being used for enabling or disabling a function of collecting the resources. The function disabling module 1040 is configured to disable, when the function of collecting the resources is in an enabled state, the function of collecting the resources for the first virtual object in response to a touch operation for the function switch control. The function enabling module 1050 is configured to enable, when the function of collecting the resources is in a disabled state, the function of collecting the resources for the first virtual object in response to a touch operation for the function switch control. In an example embodiment, as shown in FIG. 11, the apparatus 1000 further includes: a resource update module 1060. The resource update module 1060 is configured to determine a resource increase quantity of the first virtual object when a resource increase operation is detected; and update the quantity of the resources associated with or owned by the first virtual object according to the resource increase quantity.

In an example embodiment, the resource increase operation includes at least one of the following: the first virtual object killing a second virtual object, the first virtual object causing health points of the second virtual object to lose, the first virtual object performing a fifth behavior to cause health points of the second virtual object to lose, the first virtual object performing the fifth behavior, a touch operation for an operation control corresponding to the fifth behavior, and the first virtual object obtaining a resource increase prop, where the second virtual object is a virtual object in a camp different from that of the first virtual object.

In an example embodiment, the resource update module 1060 is configured to determine a resource decrease quantity of the first virtual object; and update the quantity of the resources associated with or owned by the first virtual object according to the resource decrease quantity.

In one embodiment, a first virtual object can be controlled through a particular attack control to perform at least two different behaviors, so that one control controls different behaviors. Therefore, when behaviors of the first virtual object are increased, no new icon corresponding to the operation controls needs to be added in a user interface, to avoid interface congestion caused by excessive icons, reduce the misoperation probability of the user, and ensure the operation accuracy.

Additionally, when a touch operation for the particular attack control is detected, different behaviors to be performed by the first virtual object are selected from the at least two different behaviors based on resources associated with or owned by the first virtual object. That is, when the first virtual object owns different resources, actions of the particular attack control are different, so that the particular attack control is diversified, and the user may control the resources associated with or owned by the first virtual object to control the actions of the particular attack control, and then use the particular attack control to implement the different actions, making operations flexible.

When the apparatus provided in the foregoing embodiment implements the functions of the apparatus, only division of the foregoing function modules is used as an example for description. In the practical application, the functions may be allocated to and completed by different function modules according to requirements. That is, an internal structure of the device is divided into different function modules, to complete all or some of the functions described above. In addition, the apparatus and method embodiments provided in the foregoing embodiments belong to the same conception. For the example implementation process, reference may be made to the method embodiments, and details are already described herein.

Figure 12:
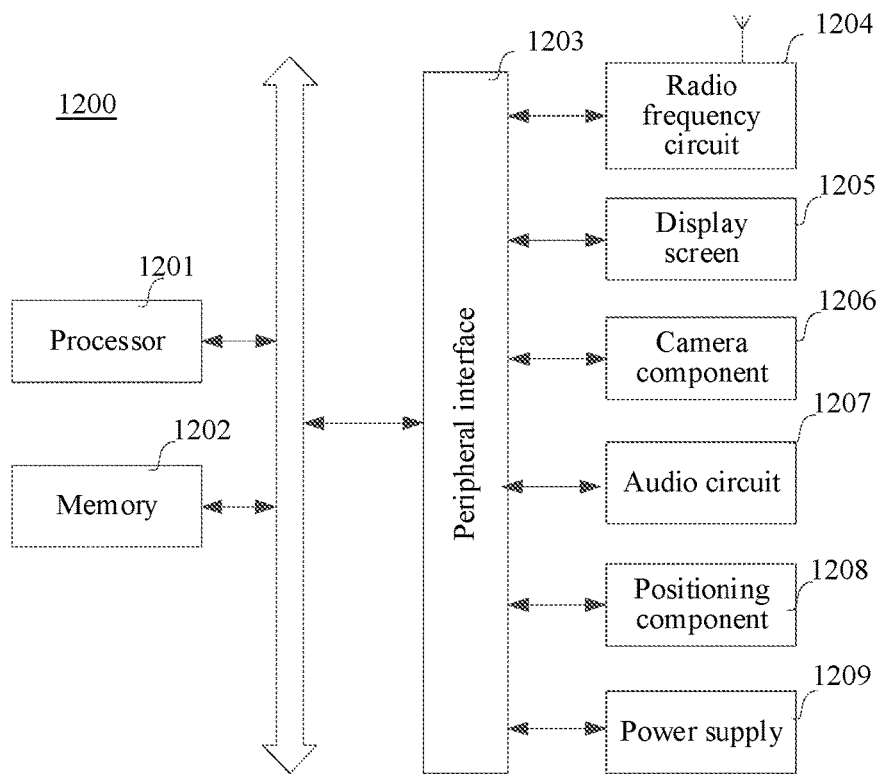
FIG. 12 is a structural block diagram of a terminal according to an embodiment.

FIG. 12 is a structural block diagram of a terminal 1200 according to an embodiment of this application. The terminal 1200 may be an electronic device such as a mobile phone, a tablet computer, a game console, an e-book reader, a multimedia player, a wearable device, or a PC. The terminal is configured to implement the virtual object control method provided in the foregoing embodiments. The terminal may be the terminal 10 in the game running environment shown in FIG. 1. Specifically:

The terminal 1200 includes a processor 1201 and a memory 1202. The processor 1201 may include one or more processing cores, for example, a 4-core processor or an 8-core processor. The processor 1201 may be implemented in at least one hardware form of a digital signal processor (DSP), a field-programmable gate array (FPGA), and a programmable logic array (PLA). The processor 1201 may alternatively include a main processor and a coprocessor. The main processor is configured to process data in an awake state, also referred to as a central processing unit (CPU); and the coprocessor is a low-power processor configured to process data in a standby state. In some embodiments, the processor 1201 may be integrated with a graphics processing unit (GPU). The GPU is configured to render and draw content that needs to be displayed on a display screen. In some embodiments, the processor 1201 may further include an artificial intelligence (AI) processor. The AI processor is configured to process a calculation operation related to machine learning.

The memory 1202 may include one or more computer-readable storage media. The computer-readable storage medium may be non-transient. The memory 1202 may further include a high-speed random access memory and a non-volatile memory such as one or more magnetic disk storage devices and a flash storage device. In some embodiments, the non-transient computer-readable storage medium in the memory 1202 is configured to store at least one instruction, at least one program, a code set, or an instruction set, the at least one instruction, the at least one program, the code set, or the instruction set being configured to be executed by one or more processors to implement the virtual object control method.

In some embodiments, the terminal 1200 may In some embodiments include a peripheral interface 1203 and at least one peripheral. The processor 1201, the memory 1202, and the peripheral interface 1203 may be connected through a bus or a signal cable. Each peripheral may be connected to the peripheral interface 1203 through a bus, a signal cable, or a circuit board. The peripheral includes at least one of a radio frequency circuit 1204, a display screen 1205, a camera assembly 1206, an audio circuit 1207, a positioning assembly 1208, and a power supply 1209.

A person skilled in the art may understand that the structure shown in FIG. 12 does not constitute a limitation on the terminal 1200, and the terminal may include more or fewer components than those shown in the figure, or some components may be combined, or a different component deployment may be used.

In an example embodiment, a computer-readable storage medium is further provided, storing at least one instruction, at least one program, a code set, or an instruction set, the at least one instruction, the at least one program, the code set, or the instruction set being executed by a processor to implement the foregoing virtual object control method.

In some embodiments, the computer-readable storage medium may include: a read-only memory (ROM), a RAM, a solid state drive (SSD), an optical disc, or the like. The RAM may include a resistance random access memory (ReRAM) and a dynamic random access memory (DRAM).

In an example embodiment, a computer program product or a computer program is further provided. The computer program product or the computer program includes computer instructions, and the computer instructions are stored in a computer-readable storage medium. A processor of a computer device reads the computer instructions from the computer-readable storage medium and executes the computer instructions to cause the computer device to perform the foregoing virtual object control method.

It is to be understood that "plurality of" mentioned in this specification means two or more. The "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, the step numbers described in this specification merely schematically show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. These are merely examples and other examples in additional embodiments are included and contemplated.

The foregoing descriptions are merely example embodiments of this application, but are not intended to limit this application. Any modification, equivalent replacement, or improvement made within the spirit and principle of this application shall fall within the protection scope of this application.

What is claimed is:

1. A virtual object control method, performed by a terminal, the method comprising:
    displaying a display picture corresponding to a virtual environment and displaying a particular attack control, wherein the particular attack control is configured for controlling a first virtual object in the virtual environment to perform at least two different behaviors;
    obtaining a quantity of resources associated with the first virtual object, the resources being consumed items configured for performing a behavior corresponding to the particular attack control;
    determining, in response to a touch operation for the particular attack control, a target behavior from the at least two different behaviors according to a value range to which the quantity belongs; and controlling the first virtual object to perform the target behavior.

2. The method according to claim 1, wherein the at least two different behaviors comprise a first behavior, a second behavior, and a third behavior; and the determining the target behavior in further comprises:
    determining the target behavior as the first behavior when the quantity belongs to a first value range;
    determining the target behavior as the second behavior when the quantity belongs to a second value range; and
    determining the target behavior as the third behavior when the quantity belongs to a third value range, wherein the first value range, the second value range, and the third value range are independent of each other and have no intersection.

3. A virtual object control method, performed by a terminal, the method comprising:
    displaying a display picture corresponding to a virtual environment and displaying a particular attack control, wherein the particular attack control is configured for controlling a first virtual object in the virtual environment to perform at least two different behaviors;
    obtaining a quantity of resources associated with the first virtual object, the resources being consumed items configured for performing a behavior corresponding to the particular attack control;
    determining an operation attribute of a touch operation for the particular attack control;
    determining, in response to the touch operation for the particular attack control, a target behavior from the at least two different behaviors according to the resources associated with the first virtual object and based on the quantity and the operation attribute; and
    controlling the first virtual object to perform the target behavior.

4. The method according to claim 3, wherein the at least two different behaviors comprise a first behavior, a second behavior, and a third behavior; and the determining the target behavior further comprises:
    determining the target behavior as the first behavior when the quantity belongs to a first value range and the operation attribute is a first operation attribute;
    determining the target behavior as the second behavior when the quantity belongs to a second value range and the operation attribute is the first operation attribute;
    determining the target behavior as the first behavior when the quantity belongs to the second value range and the operation attribute is a second operation attribute; and
    determining the target behavior as the third behavior when the quantity belongs to a third value range and the operation attribute is the first operation attribute;

determining the target behavior as the first behavior when the quantity belongs to the third value range and the operation attribute is the second operation attribute; and
determining the target behavior as the second behavior when the quantity belongs to the third value range and the operation attribute is a third operation attribute.

5. The method according to claim 3, wherein the at least two different behaviors comprise a first behavior, a second behavior, and a third behavior; and the determining the target behavior further comprises:
determining the target behavior as the first behavior when the operation attribute is a first operation attribute and the quantity is greater than a first threshold;
determining the target behavior as the second behavior when the operation attribute is a second operation attribute and the quantity is greater than a second threshold;
determining the target behavior as the first behavior when the operation attribute is the second operation attribute and the quantity is less than the second threshold and greater than the first threshold;
determining the target behavior as the third behavior when the operation attribute is a third operation attribute and the quantity is greater than a third threshold;
determining the target behavior as the second behavior when the operation attribute is the third operation attribute and the quantity is less than the third threshold and greater than the second threshold; and
determining the target behavior as the first behavior when the operation attribute is the third operation attribute and the quantity is less than the second threshold and greater than the first threshold.

6. The method according to claim 2, wherein the first behavior is configured for fighting back against an attack behavior of a second virtual object, the second behavior is configured for reducing a movement speed of the second virtual object and increasing health points of the first virtual object when health points of the second virtual object are reduced, and the third behavior is configured for clearing the health points of the second virtual object when the health points of the second virtual object is less than a target value, wherein the second virtual object is a virtual object in a camp different from that of the first virtual object.

7. The method according to claim 3, wherein the at least two different behaviors further comprise a fourth behavior, and the fourth behavior comprises an ordinary attack behavior; and the determining a target behavior further comprises:
determining the target behavior as the fourth behavior when the quantity is less than a first threshold; or
determining the target behavior as the fourth behavior when the quantity is greater than the first threshold and the operation attribute of the touch operation is a fourth operation attribute.

8. The method according to claim 1, further comprising:
displaying a function switch control, the function switch control being configured for enabling or disabling a function of collecting the resources;
disabling, when the function of collecting the resources is in an enabled state, the function of collecting the resources for the first virtual object in response to a touch operation for the function switch control; and
enabling, when the function of collecting the resources is in a disabled state, the function of collecting the resources for the first virtual object in response to a touch operation for the function switch control.

9. The method according to claim 1, further comprising:
determining a resource increase quantity of the first virtual object when a resource increase operation is detected; and
updating the quantity of the resources associated with the first virtual object according to the resource increase quantity.

10. The method according to claim 9, wherein the resource increase operation comprises at least one of the following:
the first virtual object killing a second virtual object;
the first virtual object causing health points of the second virtual object to lose;
the first virtual object performing a fifth behavior, a touch operation for an operation control corresponding to the fifth behavior; or
the first virtual object obtaining a resource increase prop;
wherein the second virtual object is a virtual object in a camp different from that of the first virtual object.

11. The method according to claim 1, wherein after the controlling the first virtual object to perform the target behavior, the method further comprises:
determining a resource decrease quantity of the first virtual object; and
updating the quantity of the resources associated with the first virtual object according to the resource decrease quantity.

12. A mobile terminal, comprising a processor and a memory, the memory storing at least one instruction, at least one program, a code set, or an instruction set, the at least one instruction, the at least one program, the code set, or the instruction set being loaded and executed by the processor to implement the virtual object control method according to claim 1.

13. A virtual object control apparatus, comprising:
a control display module, configured to display a display picture corresponding to a virtual environment and to display a particular attack control, the particular attack control being configured for controlling a first virtual object in the virtual environment to perform at least two different behaviors;
a behavior determining module configured to determine, in response to a touch operation for the particular attack control, a target behavior from the at least two different behaviors according to resources associated with the first virtual object, and to obtain a quantity of the resources associated with the first virtual object, wherein the resources are consumed items for performing a behavior corresponding to the particular attack control; and
a behavior execution module configured to control the first virtual object to perform the target behavior, and to determine the target behavior in the at least two different behaviors according to a value range to which the quantity belongs.

14. The virtual object control apparatus of claim 13, wherein the behavior determining module is further configured for determining a resource decrease quantity of the first virtual object and updating the quantity of the resources associated with the first virtual object according to the resource decrease quantity.

15. A non-transitory computer-readable storage medium, storing at least one instruction or program that is configured to be loaded and executed by a processor to implement the method according to claim 1.

16. The non-transitory computer-readable storage medium according to claim 15, wherein the determining a target behavior further comprises:

obtaining a quantity of the resources associated with the first virtual object;

determining an operation attribute of the touch operation; and determining the target behavior in the at least two different behaviors based on the quantity and the operation attribute.

17. The non-transitory computer-readable storage medium according to claim 16, wherein the at least two different behaviors comprise a first behavior, a second behavior, and a third behavior; and the determining the target behavior further comprises:

determining the target behavior as the first behavior when the quantity belongs to a first value range and the operation attribute is a first operation attribute;

determining the target behavior as the second behavior when the quantity belongs to a second value range and the operation attribute is the first operation attribute;

determining the target behavior as the first behavior when the quantity belongs to the second value range and the operation attribute is a second operation attribute; and determining the target behavior as the third behavior when the quantity belongs to a third value range and the operation attribute is the first operation attribute;

determining the target behavior as the first behavior when the quantity belongs to the third value range and the operation attribute is the second operation attribute; and determining the target behavior as the second behavior when the quantity belongs to the third value range and the operation attribute is a third operation attribute.

18. The non-transitory computer-readable storage medium according to claim 16, wherein the at least two different behaviors comprise a first behavior, a second behavior, and a third behavior; and the determining the target behavior further comprises:

determining the target behavior as the first behavior when the operation attribute is a first operation attribute and the quantity is greater than a first threshold;

determining the target behavior as the second behavior when the operation attribute is a second operation attribute and the quantity is greater than a second threshold;

determining the target behavior as the first behavior when the operation attribute is the second operation attribute and the quantity is less than the second threshold and greater than the first threshold;

determining the target behavior as the third behavior when the operation attribute is a third operation attribute and the quantity is greater than a third threshold;

determining the target behavior as the second behavior when the operation attribute is the third operation attribute and the quantity is less than the third threshold and greater than the second threshold; and determining the target behavior as the first behavior when the operation attribute is the third operation attribute and the quantity is less than the second threshold and greater than the first threshold.

* * * * *